Figure 1:
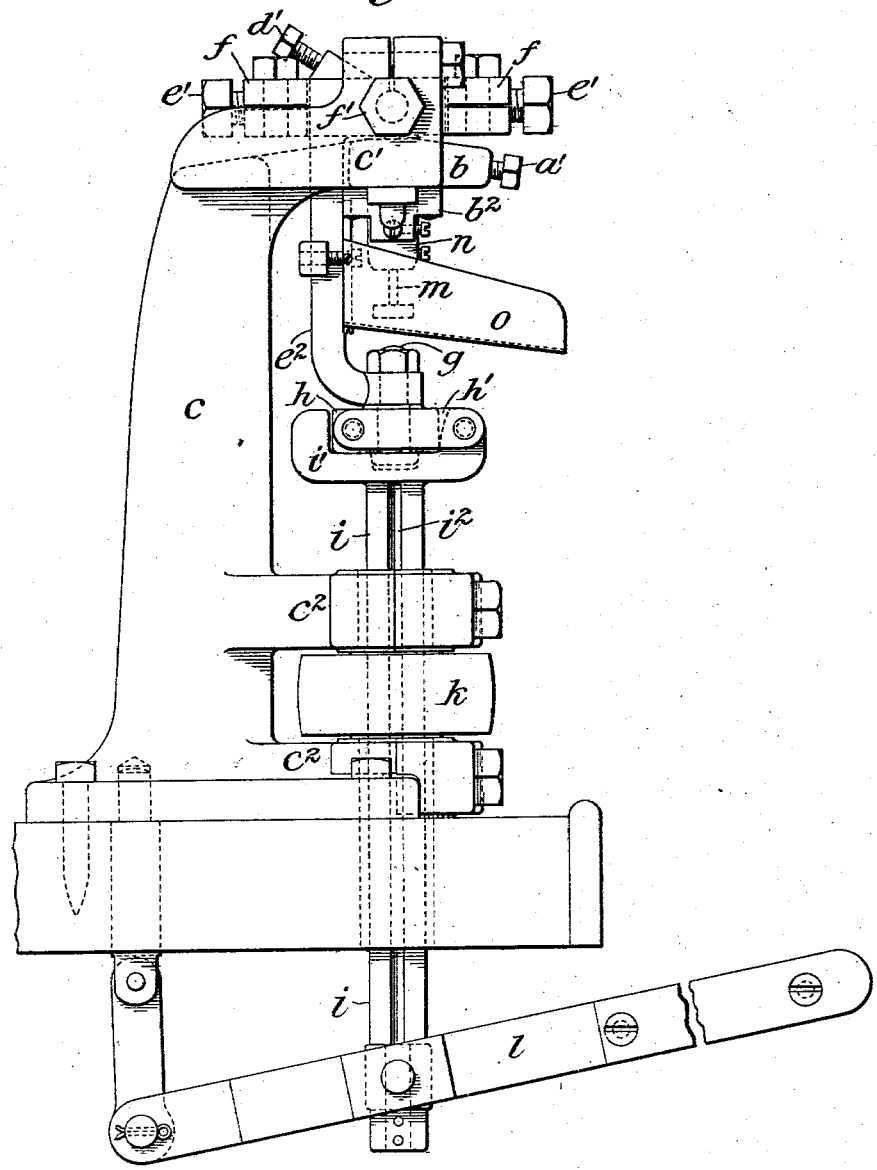

No. 740,492. PATENTED OCT. 6, 1903.
C. H. VEEDER.
MACHINE FOR CUTTING OFF METAL RODS, &c.
APPLICATION FILED APR. 10, 1903.
NO MODEL. 4 SHEETS—SHEET 2.

Attest:
A. N. Jesbera.
Lucius Varney.

Inventor:
Curtis Hussey Veeder
by Redding, Kiddle & Greeley
Attys.

No. 740,492. PATENTED OCT. 6, 1903.
C. H. VEEDER.
MACHINE FOR CUTTING OFF METAL RODS, &c.
APPLICATION FILED APR. 10, 1903.
NO MODEL. 4 SHEETS—SHEET 3.
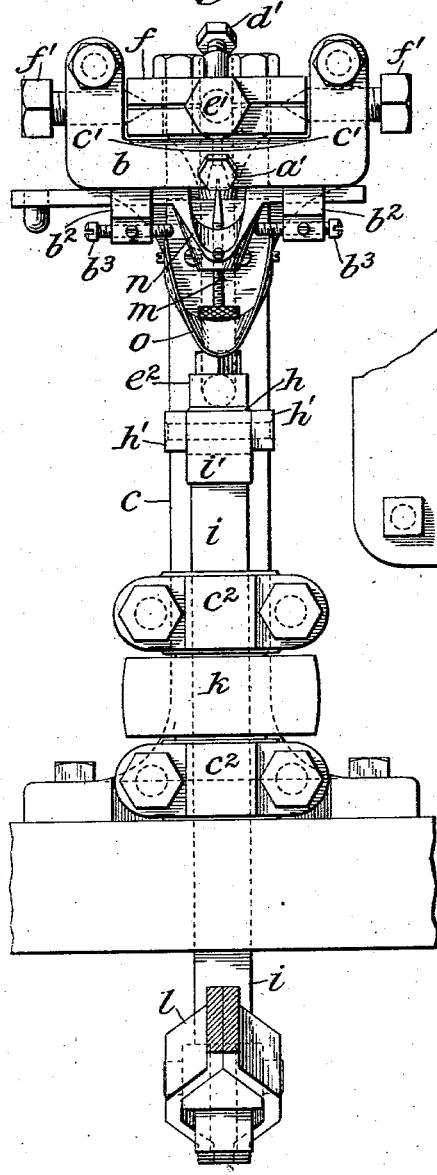
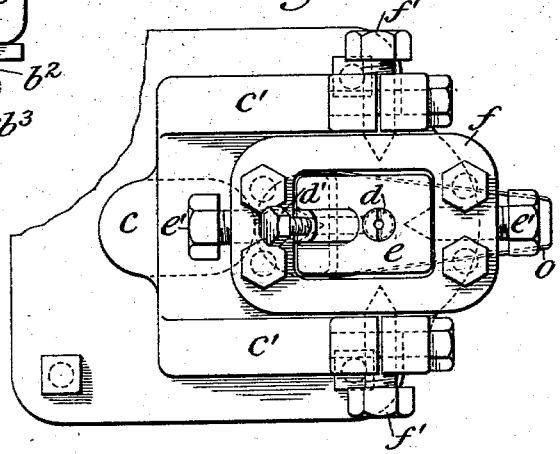
Attest:
A. N. Jesbera
Lucius Varney
Inventor:
Curtis Hussey Veeder
by Redding Kiddle & Greeley
Attys.

No. 740,492. PATENTED OCT. 6, 1903.
C. H. VEEDER.
MACHINE FOR CUTTING OFF METAL RODS, &c.
APPLICATION FILED APR. 10, 1903.
NO MODEL. 4 SHEETS—SHEET 4.

Attest:
A. N. Jesbera
Lucius Varney

Inventor:
Curtis Hussey Veeder
by Redding, Kiddle & Greeley
Attys.

No. 740,492. Patented October 6, 1903.

UNITED STATES PATENT OFFICE.

CURTIS HUSSEY VEEDER, OF HARTFORD, CONNECTICUT, ASSIGNOR TO THE VEEDER MANUFACTURING COMPANY, OF HARTFORD, CONNECTICUT, A CORPORATION OF CONNECTICUT.

MACHINE FOR CUTTING OFF METAL RODS, &c.

SPECIFICATION forming part of Letters Patent No. 740,492, dated October 6, 1903.

Application filed April 10, 1903. Serial No. 151,956. (No model.)

*To all whom it may concern:*

Be it known that I, CURTIS HUSSEY VEEDER, a citizen of the United States, residing in the city of Hartford, county of Hartford, State of Connecticut, have invented certain new and useful Improvements in Machines for Cutting Off Metal Rods, &c., of which the following is a specification, reference being had to the accompanying drawings, forming a part hereof.

It is well known that when wire, rods, or bars of metal are cut off or sheared off by the ordinary methods there is likely to be more or less distortion of the ends of the wire, rod, or bar adjacent to the cut and that sometimes a fin or bur is left. When the wire, rod, or bar is used in long lengths, the amount of labor necessary to restore the ends to their proper shape or to remove the fins or burs is not an important consideration, and ordinary methods of cutting or shearing can be employed; but when the wire, rod, or bar is to be used in many short lengths the value of the labor necessary to restore or finish the ends bears an unduly large ratio to the value of the finished part.

It is therefore the object of this invention to produce a machine which shall be capable of cutting off wire, rods, or bars either of cylindrical or other cross-section without materially distorting the ends and without leaving any fin or bur and of operating with great rapidity. Obviously a single cut in one direction only is liable to produce excessive distortion, and the present machine is therefore so organized as to cut or shear progressively from different points about the wire, rod, or bar to be cut. As thus organized the machine comprises two coöperating bushings arranged and formed to have a shearing action upon the wire, rod, or bar to be cut which is passed through them, the one of said bushings having a rolling motion of progressively-increasing eccentricity with respect to the other bushing, such bushings preferably having no movement of rotation with respect to the wire, rod, or bar to be cut other than the rolling action referred to. As will appear more clearly hereinafter, the bushings may have an actual movement of rotation if the wire, rod, or bar also has a movement of rotation about its axis, while they should have no movement of rotation other than the relative rolling movement referred to if the wire, rod, or bar to be cut does not rotate about its own axis.

The invention finds expression in its simplest mechanical form when the wire, rod, or bar and the bushings rotate at the same angular speed about the axis of the wire, rod, or bar; but in some cases it is impracticable when handling the wire, rod, or bar in long lengths to let it rotate about its own axis, and in such cases the bushings are held from rotation about their axes, having only the relative rolling movement necessary to secure the progressive shearing action.

In the accompanying drawings both embodiments of the invention are illustrated for the purpose of enabling the nature of the invention to be understood.

Figure 2:
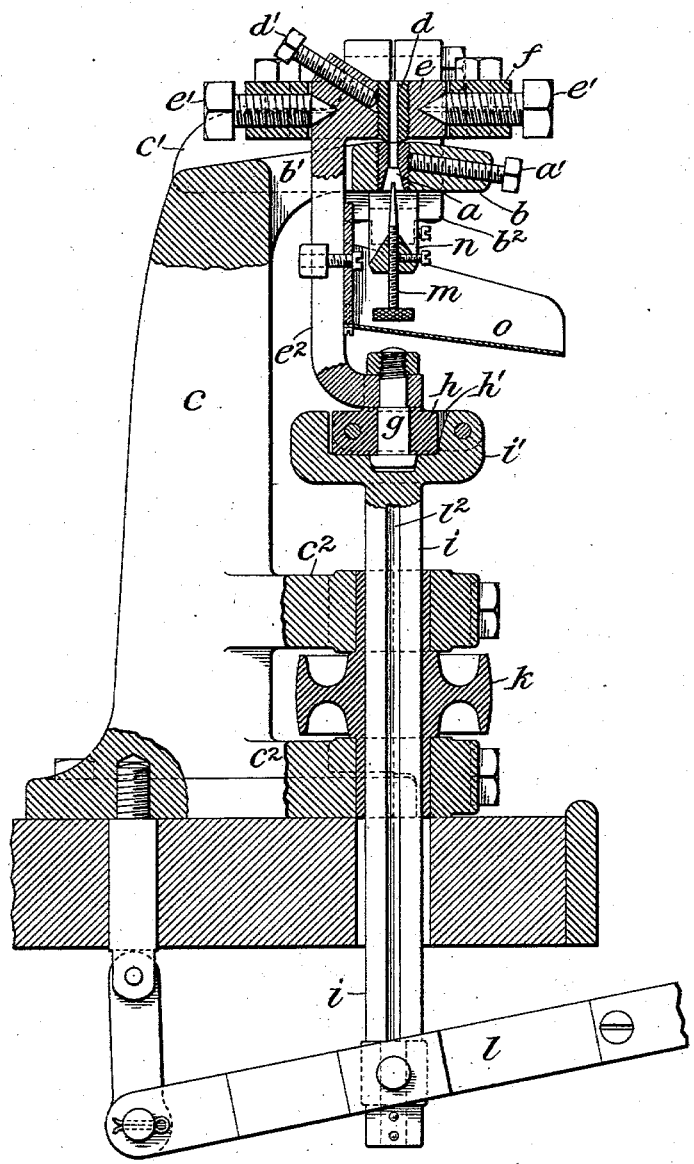
Figure 5:
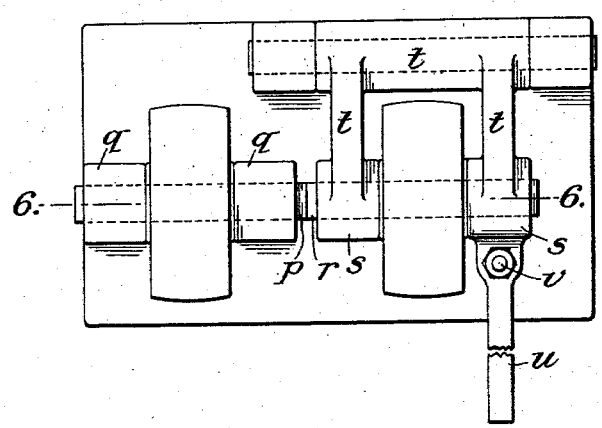
Figure 6:
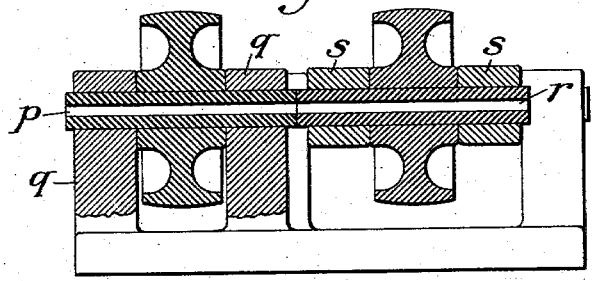
Figure 7:
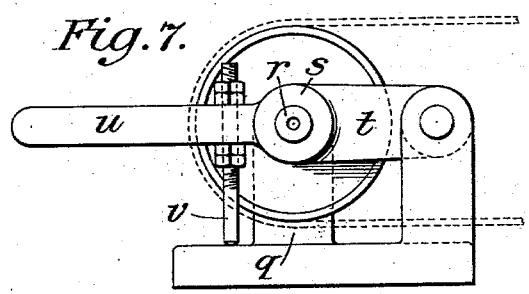

In said drawings, Figure 1 is a view in side elevation of a machine operating in accordance with the invention, the coöperating bushings having no movement of rotation about their own axes. Fig. 2 is a view in vertical central section. Figs. 3 and 4 are respectively a front elevation with the operating-handle in section and a top plan view of the same. Figs. 5, 6, and 7 are respectively a plan view, a longitudinal section on the plane indicated by the line 6 6 of Fig. 5, and an end elevation of an embodiment of the invention in which the bushings are adapted to rotate with the wire, rod, or bar to be cut.

In the machine shown in Figs. 1, 2, 3, and 4 the two parts which by their coöperation progressively shear the wire, rod, or bar and for convenience are called "bushings," although, as will be obvious, they might have a form not exactly described by the name "bushing," are so mounted as to be held from rotation. The bushing $a$ is shown as threaded in an arm $b$ of the standard $c$ of the machine and is secured therein by a set-screw $a'$. The coöperating bushing $d$ is likewise held from rotation about its own axis, but is so mounted as to be progressively displaced in a path of gradually-increasing eccentricity with respect to the axis of the bushing $a$.

To this end it is threaded in a block $e$ and is secured therein by a set-screw $d'$, the block $e$ being mounted in gimbals. The block $e$ is directly supported by pivot-screws $e'$ in a frame $f$, which in turn is supported by pivot-screws $f'$ at right angles to the pivot-screws $e'$ between suitable brackets $c'$ at the head of the standard $c$. The block $e$ is provided with an arm $e^2$, which is extended downwardly through an opening $b'$ in the arm $b$ and is turned at right angles to engage a pin $g$. The latter is mounted in a block $h$, connected by links $h'$ with the head $i'$ of a shaft $i$. The shaft $i$ is arranged to have an endwise movement as well as a rapid rotary movement, the pulley $k$, by which it is driven, being mounted between projecting brackets $c^2$ of the standard $c$ and being engaged with the shaft to rotate the same, while permitting longitudinal movement of the shaft, by a longitudinal groove $i^2$ in the shaft. A lever $l$ is provided to support the shaft and effect the required longitudinal movement thereof. To limit the forward feed of the wire, rod, or bar to be cut, an adjustable stop $m$ is supported in axial alinement with the fixed bushing $a$, being mounted in a slide $n$, so that the stop can be displaced laterally to permit the discharge of that portion of the wire, rod, or bar which has just been cut off and rests against the end of the stop. The slide $n$ may be supported in suitable brackets $b^2$, depending from the arm $b$, set-screws $b^3$ being also provided to limit the movement of the slide with the stop. A trough $o$ may be secured to the arm $e^2$ to discharge the cut-off portion away from the line of the shaft $i$. In the operation of the machine shown in these views, Figs. 1, 2, 3, and 4, bushings $a$ and $d$, with a bore approximating to the diameter of the wire, rod, or bar to be cut, having been placed in their respective holders, the wire, rod, or bar is fed through the bushings until its end rests against the stop $m$. The shaft $i$ being now in its highest position, it is rotated rapidly and at the same time is gradually moved downward and away from the fixed bushing $a$. When the shaft $i$ is in its highest position, as clearly shown in Fig. 2, the pin $g$ is axially in alinement with the shaft $i$ and the bushings $a$ and $d$; but as the shaft is moved downward or away from the bushing $a$ the action of the hinged block $h$ and links $h'$ will throw the pin $g$ out of alinement, thereby also throwing the bushing $d$ out of alinement. The eccentricity of the bushing $d$ with respect to the bushing $a$ will thus be gradually increased, and as the shaft $i$ is continuously rotated at a high speed the working edge of the bushing $d$ will act successively at different points about the periphery of the wire, rod, or bar to be cut and by reason of the increasing eccentricity will likewise act progressively until the wire, rod, or bar is finally severed through the coöperation of the two bushings. By reason of the fact that there is no angular displacement of the working edge of either bushing with respect to the wire, rod, or bar to be sheared and of the further fact that the point where the shearing action takes place travels with a rolling motion around the wire, rod, or bar to be cut in a path of gradually-increasing eccentricity, progressively shearing the metal from different points in succession, there is no material distortion of the ends of the wire, rod, or bar and no bur or fin, or at least no more bur or fin than may be completely removed by a slight tumbling or other similar finishing operation.

In the embodiment of the invention represented in Figs. 5, 6, and 7 one bushing $p$ is adapted to rotate in fixed bearings $q$, while the other bushing $r$ is mounted in bearings which are movable transversely with respect to the axis of the bushing $p$. Such bearings $s$ may be supported by the arms of a frame $t$, pivoted eccentrically with respect to the bushing $p$ and provided with an operating-handle $u$, and, if desired, with an adjustable stop $v$. In this embodiment of the invention the wire, rod, or bar to be cut rotates with the bushings $p$ and $r$ and at substantially the same angular velocity. Therefore when the bushing $r$ is shifted out of alinement with the bushing $p$ and its eccentricity is continually increased the point of shearing of the metal progresses with a rolling movement with respect to the periphery of the wire, rod, or bar. The action of the two described forms of the machine is therefore the same, the relations of the bushings to each other and to the wire, rod, or bar to be cut being substantially identical.

Other means than those shown for giving to the movable bushing the required movement with respect to the relatively fixed bushing whether both bushings and the wire rotate about their own axes or whether they do not will readily suggest themselves, and it will be understood that as to all of the details of construction and arrangement various changes may be made without departing from the spirit of the invention.

I claim as my invention—

1. A machine for cutting or shearing wire, rods or bars, &c., comprising two coöperating bushings adapted to receive the wire, rod or bar through them, and means to impart to one of said bushings with respect to the wire, rod or bar a progressive rolling movement with gradually-increasing eccentricity, substantially as described.

2. A machine for cutting or shearing wire, rods or bars, &c., comprising two coöperating bushings adapted to receive the wire, rod or bar through them, a relatively fixed support for one of said bushings, a relatively movable support for the other of said bushings, and means to shift said movable support to move the bushing carried thereby out of alinement with the relatively fixed bushing, whereby the working edges of said bushings coact upon the wire, rod or bar with a progressive and gradually-increasing rolling movement, substantially as described.

3. A machine for cutting or shearing wire, rods or bars, &c., comprising a relatively fixed bushing, a second bushing adapted to be moved out of alinement with the first and means to move the second bushing out of alinement with the first bushing in a path of gradually-increasing eccentricity while maintaining the same angular relation with respect to the wire, rod or bar passed through the bushings, substantially as described.

4. A machine for cutting or shearing wire, rods or bars, &c., comprising two coöperating bushings adapted to receive a wire, rod or bar through them, one of said bushings being fixed and the other of said bushings being movable, and means to give to the axis of the movable bushing a gradually-increasing eccentric rotary motion, substantially as described.

5. A machine for cutting or shearing wire, rods or bars, &c., comprising two coöperating bushings adapted to receive a wire, rod or bar through them, one of said bushings being fixed, gimbals to support the other of said bushings, and means to shift the second bushing out of alinement with the first with a gradually-increasing eccentric rotary motion of its axis, substantially as described.

6. A machine for cutting or shearing wire, rods or bars, &c., comprising two coöperating bushings adapted to receive a wire, rod or bar through them, one of said bushings being fixed, means for supporting the other of said bushings with freedom for a rotary oscillating movement, and means to impart to said movable bushing a gradually-increasing eccentric rotary motion, substantially as described.

7. A machine for cutting or shearing wire, rods or bars, &c., comprising two coöperating bushings adapted to receive a wire, rod or bar through them, one of said bushings being fixed, means to support the other of said bushings with freedom for rotary oscillating movement, a shaft in alinement with the fixed bushing and operative connections between the movable bushing and said shaft whereby the bushing receives a gradually-increasing eccentric rotary movement of its axis, substantially as described.

8. A machine for cutting or shearing wire, rods or bars, &c., comprising two coöperating bushings adapted to receive a wire, rod or bar through them, one of said bushings being fixed, and means to support the other of said bushings with freedom for rotary oscillating motion, a rotating shaft, means to move said shaft longitudinally, toggle-links mounted upon said shaft, a pin carried by said toggle-links normally in alinement with the fixed bushing, and an arm connecting said movable bushing and said pin whereby as the shaft is moved lengthwise the pin is thrown out of alinement and the bushing receives a gradually-increasing eccentric rotary motion of its axis with respect to the axis of the fixed bushing, substantially as described.

This specification signed and witnessed this 8th day of April, A. D. 1903.

CURTIS HUSSEY VEEDER.

In presence of—
E. BARRIE SMITH,
WM. B. DUNNING.